United States Patent
Smith (10) Patent No.: US 10,450,016 B2
(45) Date of Patent: Oct. 22, 2019

(54) LIFT AXLE DRAG REDUCTION SYSTEM AND METHOD

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/588,050

(22) Filed: May 5, 2017

(65) Prior Publication Data

US 2018/0319451 A1  Nov. 8, 2018

(51) Int. Cl.
  *B62D 61/12* (2006.01)
  *B60G 17/015* (2006.01)
  *B60G 17/016* (2006.01)

(52) U.S. Cl.
  CPC ............ *B62D 61/12* (2013.01); *B60G 17/016* (2013.01); *B60G 17/0155* (2013.01); *B60G 2204/4702* (2013.01); *B60G 2204/62* (2013.01); *B60G 2300/0262* (2013.01); *B60G 2400/204* (2013.01); *B60G 2400/39* (2013.01)

(58) Field of Classification Search
  CPC .. B62D 61/12; B60G 17/016; B60G 17/0155; B60G 2202/152
  USPC ........................................................ 280/86.5
  See application file for complete search history.

(56) References Cited

U.S. PATENT DOCUMENTS

| | | | | |
|---|---|---|---|---|
| 4,854,409 A * | 8/1989 | Hillebrand | ........... | B62D 61/125 180/24.02 |
| 5,090,495 A * | 2/1992 | Christenson | ............. | B60G 5/04 180/209 |
| 6,880,839 B2 * | 4/2005 | Keeler | ................... | B62D 61/12 280/124.153 |
| 7,222,867 B2 * | 5/2007 | Rotz | .................. | B60G 17/0155 180/209 |
| 8,695,998 B1 * | 4/2014 | Karel | ..................... | B62D 61/12 280/86.5 |
| 9,637,189 B2 * | 5/2017 | Karel | ................... | B62D 61/125 |
| 9,776,677 B2 * | 10/2017 | Yakimishyn | ......... | B62D 61/125 |
| 2017/0361646 A1 * | 12/2017 | Davis | ..................... | B60B 25/00 |

OTHER PUBLICATIONS

"Trailer Fixed Axle Suspension System (formerly HLM)" ©2018 Hendrickson USA, L.L.C. <http://www.hendrickson-intl.com/Auxiliary/Trailer-Non-Steer-Lift-Axle/TOUGHLIFT-FMW-B> [retrieved Mar. 7, 2018].

"M9 ACE Road Wheel" TGL SP Industries Ltd. <http://www.tgl-sp.com/m9-ace-road-wheel> [retrieved Mar. 7, 2018].

* cited by examiner

Primary Examiner — Faye M Fleming
(74) Attorney, Agent, or Firm — Christensen O'Connor Johnson Kindness PLLC (57) ABSTRACT

A disclosed lift axle is suitable for a vehicle that has a first wheel for supporting the vehicle on a road surface. The lift axle system includes a lift mechanism that is coupled to the vehicle and is configured to reciprocate an axle between a stowed position and deployed position. The lift axle system further includes a second wheel coupled to the axle. The second wheel engages the road surface when the lift mechanism is in the deployed position, and the second wheel is disengaged from the road surface when the lift mechanism is in the stowed position. The second wheel has a lower rolling resistance than the first wheel.

19 Claims, 6 Drawing Sheets

LIFT AXLE DRAG REDUCTION SYSTEM AND METHOD

BACKGROUND

A vehicle's fuel economy is the result of its total resistance to movement. This includes overcoming inertia, driveline friction, road grades, air drag, and tire rolling resistance. The relative percent of influence that these factors represent during stop-and-go city driving are very different from steady, state highway driving.

Over road vehicles, such a trucks and cars, typically use pneumatic tires to decrease weight and improve the vehicle ride. Pneumatic tires of this type include a reinforced polymer tire filled with compressed gas. The reinforced polymer and the compressed gas allow the tire to flex, i.e., deform, in order to absorb vibrations; however, the deformation of the tires contributes to tire rolling resistance. Specifically, a given portion of a pneumatic tire will repeatedly deform and recover as the tire rotates under the weight of the vehicle. This repeated deformation and recovery is not perfectly elastic and results in a loss of energy that contributes to rolling resistance.

To improve the fuel efficiency in the transportation industry, various approaches have been employed in order to reduce the rolling resistance of a vehicle tire. Generally described, some of these methods include the utilization of harder material or employment of greater inflation pressures in order to achieve lower rolling resistance. While these approaches reduce rolling resistance, they are not without drawbacks. Specifically, increasing the hardness or inflation pressure of known tires increases vehicle vibration and reduces ride quality.

The transportation industry is continuously looking for ways to improve fuel efficiency of a vehicle by reducing rolling resistance without compromising ride quality. The disclosed subject matter aims to provide such a system.

SUMMARY

A first representative embodiment of the disclosed lift axle system is suitable for a vehicle that has a first wheel for supporting the vehicle on a road surface. The lift axle system includes a lift mechanism that is coupled to the vehicle and is configured to reciprocate an axle between a stowed position and deployed position. The lift axle system further includes a second wheel coupled to the axle. The second wheel engages the road surface when the lift mechanism is in the deployed position, and the second wheel is disengaged from the road surface when the lift mechanism is in the stowed position. The second wheel has a lower rolling resistance than the first wheel.

A second representative embodiment of the disclosed lift axle system is suitable for a vehicle that has a first wheel for supporting the vehicle on a road surface. The lift axle system includes a beam rotatably coupled to the vehicle and an axle coupled to the beam. The lift axle system further includes an actuator operably coupled to the beam to selectively rotate the beam between a stowed position and a deployed position. A second wheel is coupled to the axle such that the second wheel engages the road surface when the beam is in the deployed position, and the second wheel is disengaged from the road surface when the beam is in the stowed position. The second wheel has a lower rolling resistance than the first wheel.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion proceeds with reference to examples of fuel efficiency systems suitable for use with vehicles, such as Class 8 trucks and/or trailers. Generally described, representative examples of the systems and components described herein aim to reduce rolling friction resistance in part by the contact between the vehicle's tires and the ground surface over which the vehicle is traversing. As such, the systems and/or components thereof may increase the overall fuel efficiency of a vehicle. In the examples disclosed herein, the system deploys an auxiliary axle having wheels with a lower rolling resistance during movement of the vehicle. In some embodiments, the system can be activated after the vehicle has attained a minimum threshold speed (e.g., 45 mph or greater). Additionally or alternatively, some embodiments of the system prohibit activation of the system if the vehicle has attained a maximum threshold speed (e.g., 75 mph or greater). Further, in some embodiments, the system can transition from its activated state to its inactive state if the operator of the vehicle engages a particular system on the vehicle, such as, for example, application of the vehicle brakes.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

Although representative embodiments of the present disclosure is described with reference to Class 8 trucks, it will be appreciated that aspects of the present disclosure have wide application, and therefore, may be suitable for use with many types of powered vehicles, such as passenger vehicles, buses, RVs, commercial vehicles, light and medium duty vehicles, and the like, as well as non-powered vehicles, such as trailers and the like. Accordingly, the following descriptions and illustrations herein should be considered illustrative in nature, and thus, not limiting the scope of the claimed subject matter.

Figure 1:
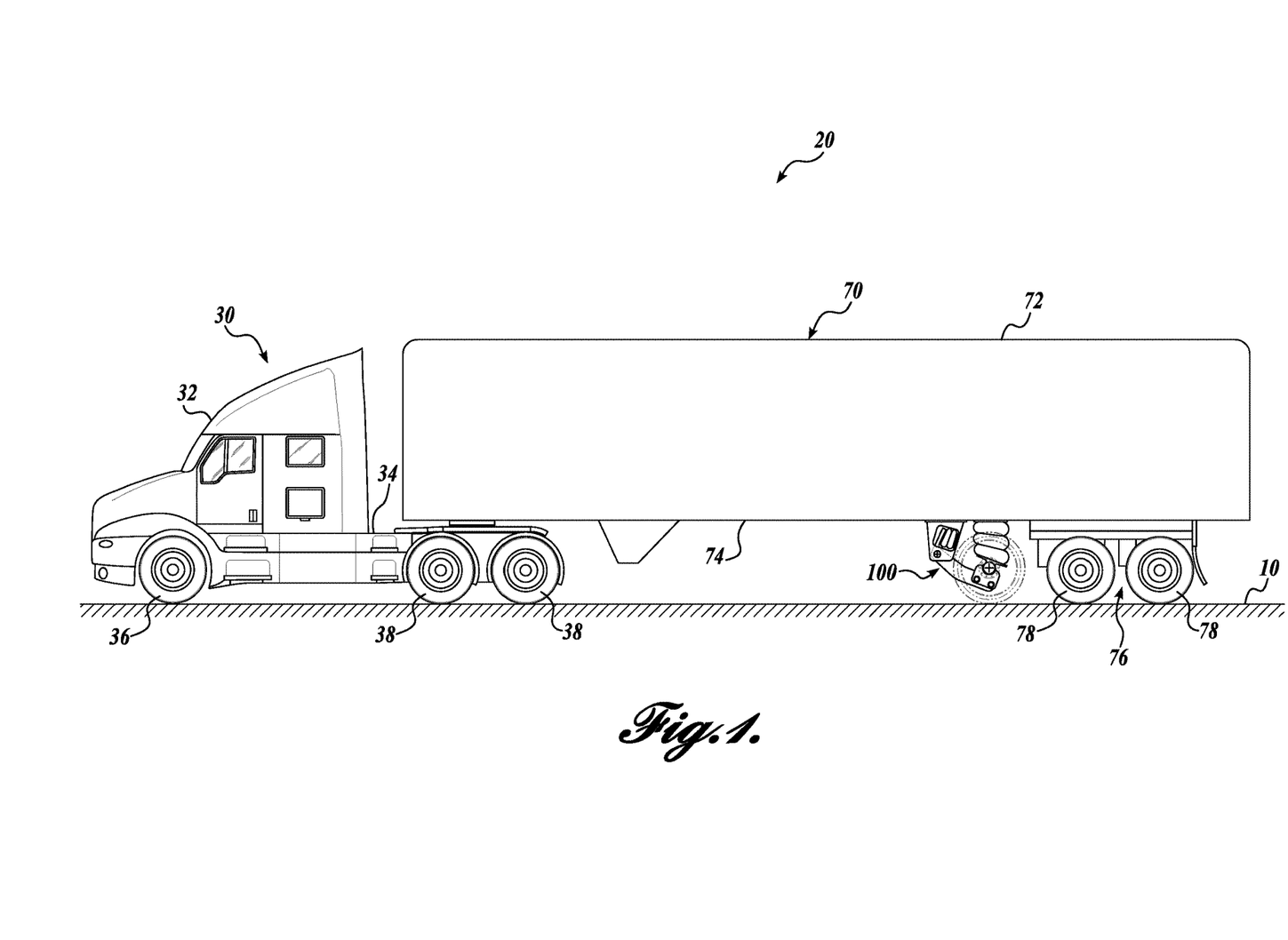
FIG. 1 shows side view of a tractor-trailer combination with a representative lift axle assembly according to the present disclosure with the lift axle in a deployed position.
Figure 2:
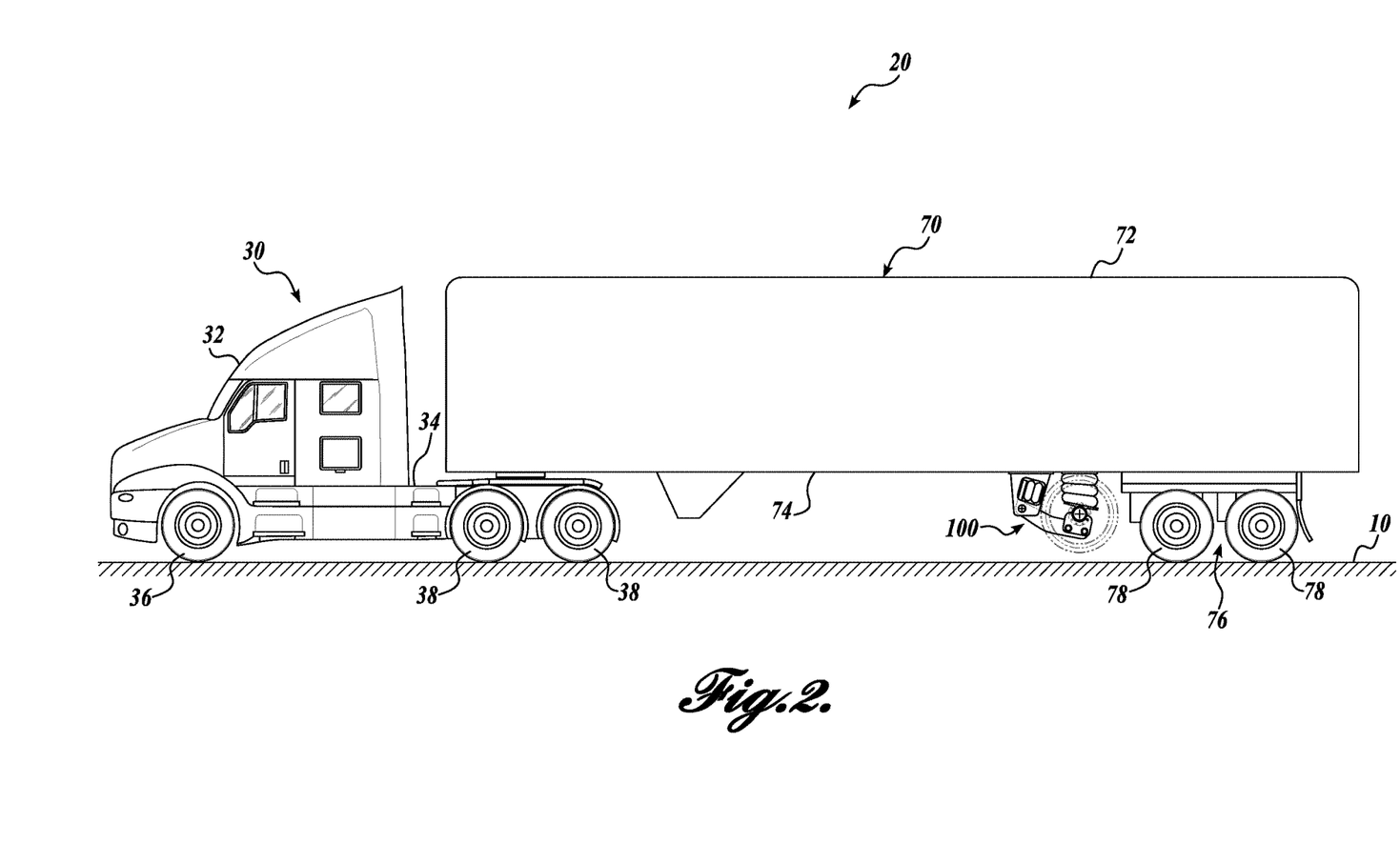
FIG. 2 shows as side view of the tractor-trailer combination of FIG. 1 with the lift axle assembly in a stowed position.

FIGS. 1 and 2 illustrate a left side view of a vehicle, such as a tractor-trailer combination 20, employing a representative embodiment of lift axle assembly 100 according to the present disclosure. In FIG. 1, the lift axle assembly 100 is in a deployed position and engages the road surface 10. In FIG. 2, the lift axle assembly 100 is in a stowed position and does not engage the road system. As will be described in greater detail, when the lift axle assembly 100 is in the deployed position of FIG. 1, the rolling resistance of the other vehicles wheels is reduced.

The tractor-trailer combination 20 includes a lead vehicle 30 in the form of a heavy duty tractor and a trailing vehicle 70 in the form of a semi-trailer or trailer. The tractor 30 is articulatedly connected to a trailer 70 by a trailer coupling, such as, for example, a so-called fifth wheel, to form a tractor-trailer combination.

The tractor 30 comprises a cab 32 mounted to a chassis 34. The chassis is supported by wheels 36 of a front wheel assembly and wheels 38 of a rear wheel assembly. The wheels 36 and 38 are connected to the chassis via conventional axles and suspension assemblies (not shown). In the embodiment shown in FIGS. 1 and 2, the rear wheel assembly is of the dual-wheel, tandem-axle type.

Still referring to FIGS. 1 and 2, the trailer 70 includes a trailer body 72 supported by a frame 74. The trailer body 72 defines a cargo carrying interior cavity (not shown). In the embodiment shown, the trailer body 72 is generally rectangular in shape, having a generally planar, vertically oriented front end panel, rear end panel, and side panels. The disclosed trailer body 72 further includes a generally planar top panel and a generally planar bottom panel, sometimes referred to as a cargo-supporting floor deck.

When coupled to a tractor 30, a front portion of the trailer 70 is supported by the tractor. A rear portion of the trailer is supported by a support assembly 76 mounted to the frame 74 of the trailer 70. The support assembly 76 includes a plurality of wheels 78 mounted to the trailer by known axle and suspension configurations (not shown). It will be appreciated that the number and location of support assemblies can vary from the disclosed embodiment. In this regard, additional support assemblies may be included so that the number and locations of wheels differ from the illustrated embodiment, and such variations should be considered within the scope of the present disclosure.

Figure 3:
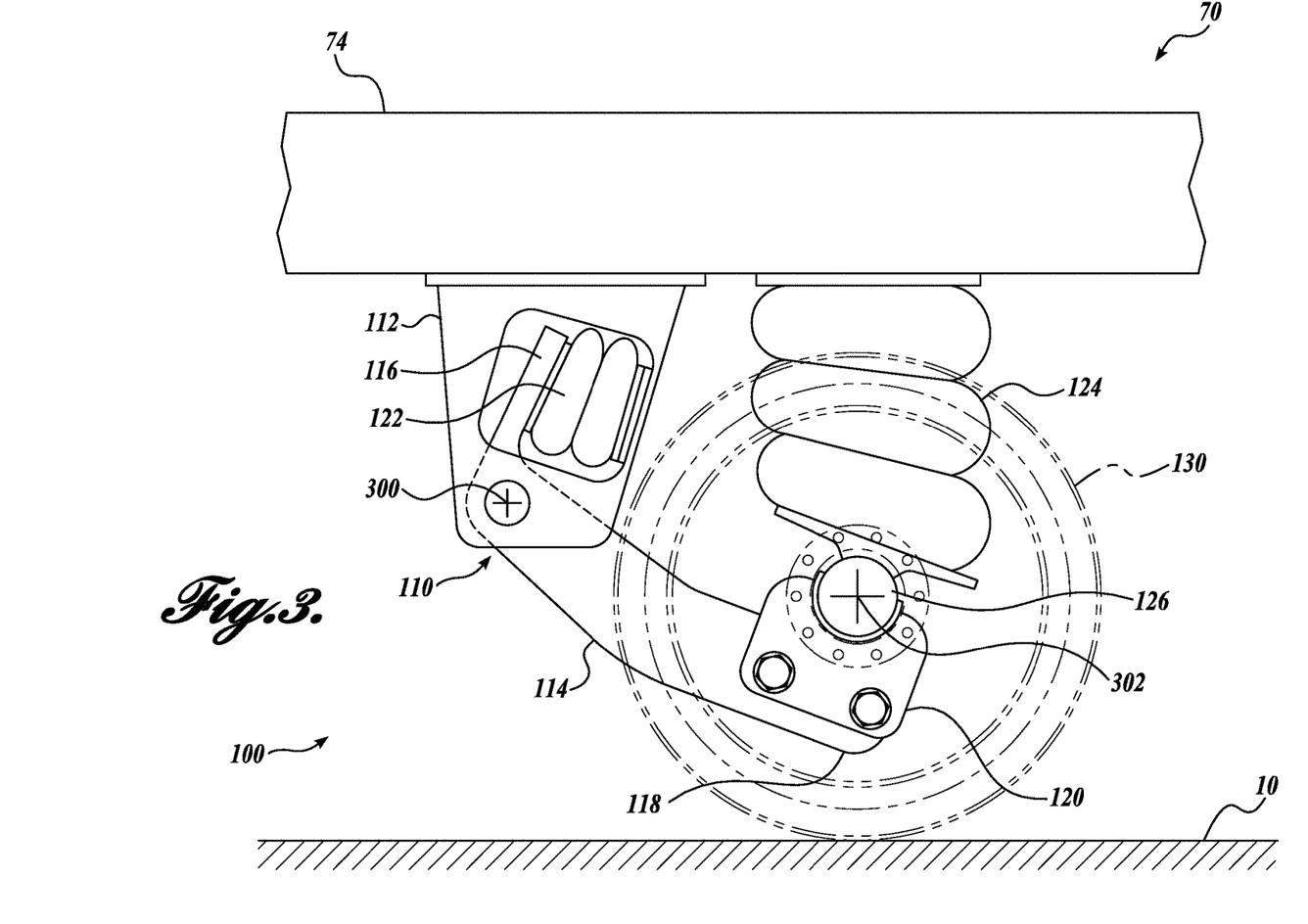
FIG. 3 shows as side view of the lift axle assembly of FIG. 1 with the axle in the deployed position.
Figure 4:
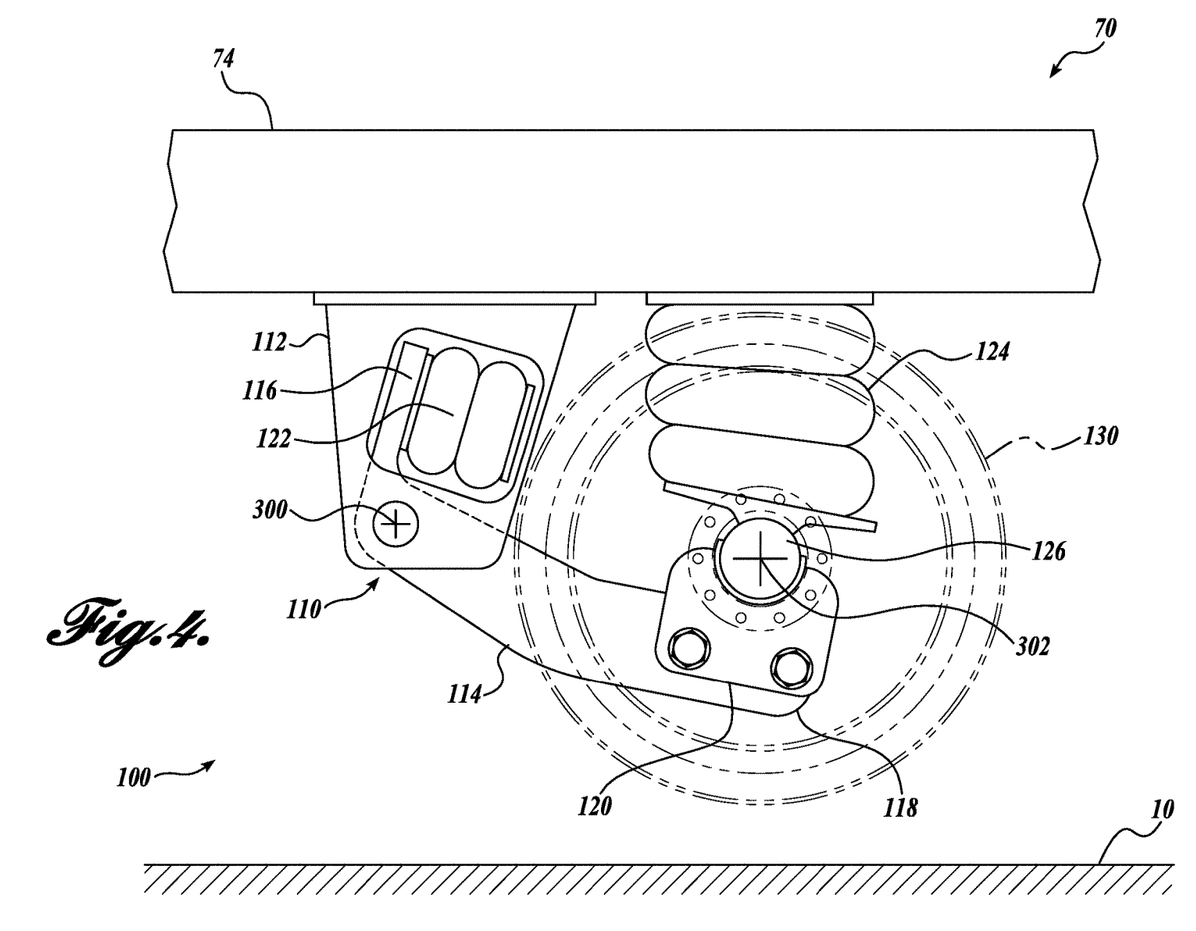
FIG. 4 shows as side view of the lift axle assembly of FIG. 1 with the axle in the stowed position.

Referring now to FIGS. 3 and 4, an exemplary embodiment of a lift axle assembly 100 includes a lift mechanism 110 mounted to the frame 74 of the trailer 70. In the illustrated embodiment, the lift mechanism 100 includes a support 112 mounted to and extending downward from the lower side of the frame 74. An L-shaped beam 114 is rotatably coupled to the support 112 about an axis 300. The axis 300 is located between a first end 116 of the beam and a second end 118 of the beam.

A lift spring 122 is disposed between and engages both the support 112 and the first end 116 of the beam. In the illustrated embodiment, the lift spring 122 is pneumatic spring comprising a bellows operatively connected to a compressed air source 214 through a valve assembly 210, described later. The compressed air source 214 and the valve assembly 210 cooperate to control the pressure within the bellows, which in turn controls the spring rate of the lift spring 122. An increase in the pressure within the bellows causes the bellows to expand. The expansion of the bellow applies a biasing force to the first end 116 of the beam 114 that tends to rotate the beam in a counter clockwise direction as viewed in FIGS. 3 and 4. That is, increasing the pressure inside of the bellows tends to move the lift axle assembly 100 toward the stowed position shown in FIG. 4.

A ride spring 124 is mounted between and engages both the trailer fame 74 and a second end 118 of the beam 114. Similar to the lift spring 122, the ride spring 124 of the illustrated embodiment is a pneumatic spring comprising a bellows operatively connected to the compressed air source 214 through the valve assembly 210. The valve assembly 210 and the compressed air source 214 cooperate to control the pressure within the bellows and, therefore, the stiffness of the ride spring 124.

The lift axle assembly 100 further includes a wheel assembly 130 supported by the lift mechanism 110. In this regard, a fitting 120 is fixedly coupled to the second end 118 of the beam 114. The fitting 120 is sized and configured to mountably couple an axle 126 to the second end beam. The wheel assembly 130 is coupled to the axle 126 such that the wheel is rotatable about an axis 302. When the beam 114 rotates about axis 300, axis 302 and, therefore, the wheel assembly 130 are raised and lowered. As a result, the wheel assembly 130 can be reciprocated between the deployed position of FIG. 3 and the stowed position of FIG. 4 by selectively rotating the beam 114 about axis 300.

In the disclosed embodiment, the lift axle assembly 100 is generally symmetrical about the centerline of the trailer 70 so that the lift mechanism 110 includes supports 112, beams 114, lift springs 122, ride springs 124, etc., on both the left and right sides of the lift axle assembly. The axle 126 extends laterally across the bottom of the trailer and is supported by left and right supports 112 with a wheel assembly 130 coupled to each end of the axle, outboard of the supports 112. It will be appreciated that the disclosed lift axle assembly 100 configuration is exemplary only and should not be considered limiting. In this regard, alternate embodiments in which the number and location of the supports, axles, and wheel assemblies vary are contemplated and should be considered within the scope of the present disclosure.

Figure 5:
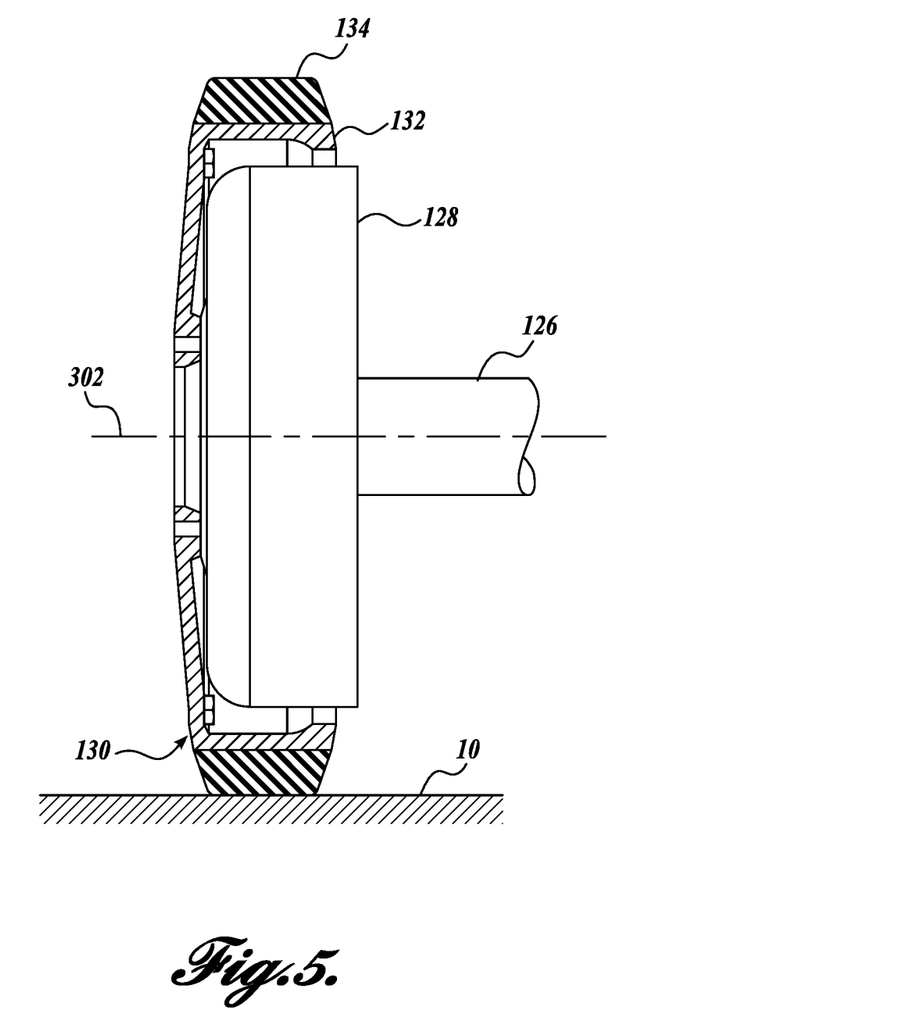
FIG. 5 shows a partial cross-sectional view of the lift axle assembly of FIG. 1.

Referring now to FIG. 5, a wheel hub 128 is coupled to each end of the axis 126. In the disclosed embodiment, at least a portion of the wheel hub 128 is rotatable relative to the axle 126 about axis 302. The wheel assembly 130 is mounted to the rotatable portion of the wheel hub 128 so that the wheel assembly 130 is also rotatable relative to the axle 126 about axis 302.

The wheel assembly 130 includes a tire that has a low rolling resistance as compared to that of the pneumatic trailer tires 78. In the illustrated embodiment, the low rolling resistance is the result of the tires having a relatively high rigidity. Still referring to FIG. 5, the exemplary wheel assembly 132 includes a wheel ring 132 sized and configured to be demountably coupled to the wheel hub 128. The wheel ring 132 may by formed of aluminum, steel, composites, or any other suitable material having sufficient strength and durability and may be formed by forging, casting, machining, or any other suitable method.

A wear ring 134 extends circumferentially around the wheel ring 132 and engages the road surface 10 when the lift axle assembly 100 is in the deployed position. The wear ring 134 is preferably formed from a durable polymeric material, such as polyurethane. It will also be appreciated that any suitable material, for example, steel, that has sufficient strength and durability and contributes to a reduced rolling resistance may be utilized.

The disclosed wheel assembly 130 is exemplary only and should not be considered limiting. The disclosed lift axle assembly 100 can include any number of different wheels having different configurations. Moreover, different wheel assemblies may be used by a particular lift axle assembly 100. In this regard any number of wheel assemblies or wheel assembly combinations that provide a lower rolling resistance are contemplated and should be considered within the scope of the present disclosure.

Figure 6:
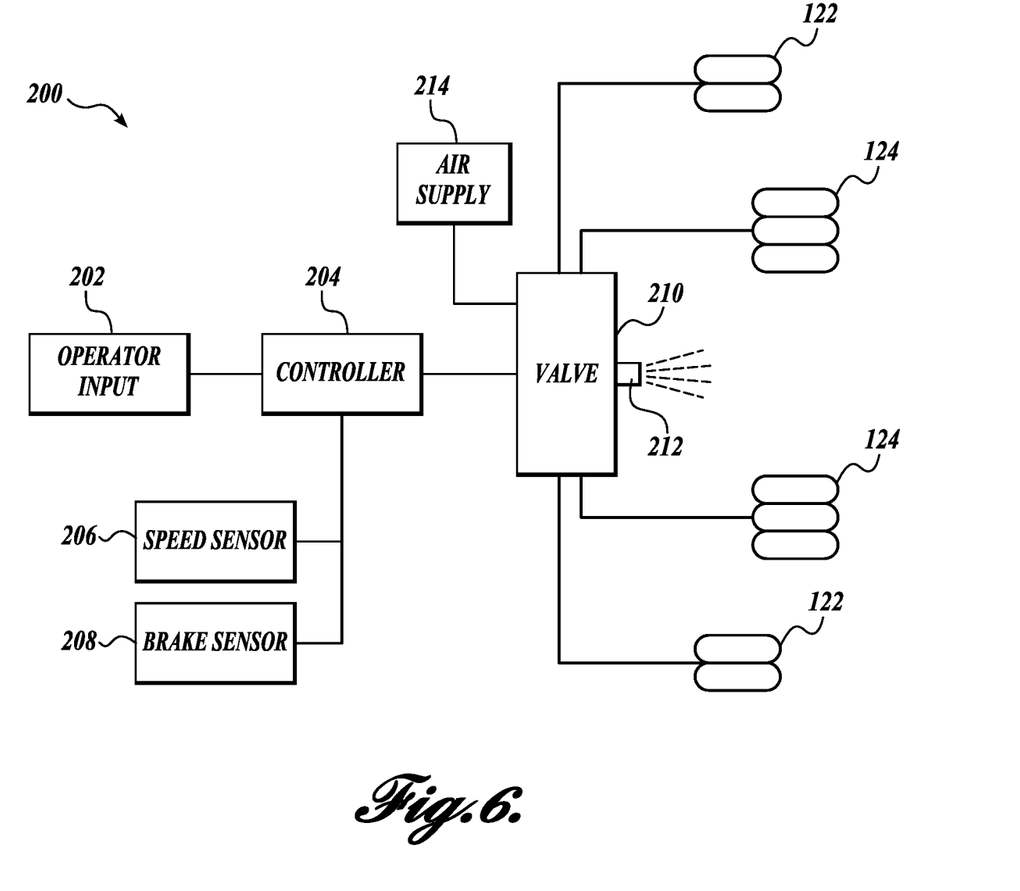
FIG. 6 shows a schematic diagram for a control assembly for the lift axle assembly of FIG. 1.

Turning now to FIG. 6, there is shown a schematic diagram of one example of a control assembly 200 for the lift axle assembly 100 in accordance with aspects of the present disclosure. The control assembly 200 includes a controller 204 operatively coupled to a valve assembly 210. The control assembly 200 can include a manual input, such as an stow/deploy switch 202, for stowing/deploying the lift axle assembly 100, or the lift axle assembly 100 can be stowed and/or deployed upon receipt of suitable control signals from another vehicle controller or from one or more vehicle sensors, such as, for example a speed sensor 206, a brake sensor 208, or other sensors that sense vehicle operating conditions.

The controller 204 controls operation of the valve assembly 210 to selectively supply compressed air from a compressed air supply 214 to the lift springs 122 and the ride springs 124. The compressed air supply 214 may be a compressed air storage tank already present on the vehicle or may be a discrete compressed air tank with a dedicated compressor. The controller 204 also controls the valve assembly 201 to provide a path to vent compressed air from the lift springs 122 and ride springs 124 through a vent 212.

When the vehicle is parked or travelling at low speeds, the lift axle assembly 100 is typically in the stowed position of FIGS. 2 and 4. In the stowed position, the valve assembly 206 provides compressed air from the compressed air supply 208 to the lift springs 122. The compressed air expands the lift springs 122 to apply a biasing force to the first end 116 of the beams 114. The biasing force rotates the beam 114 about axis 300 to raise the axle 126 and, therefore, the wheel assemblies 130 so that the wheel assemblies do not contact the road surface 10.

During vehicle operation, the speed sensor 206 sends signals to the controller 204 indicating the speed of the vehicle. When the signals indicate that the vehicle speed has reached a predetermined cruise speed, the controller 204 controls the valve assembly 206 to move the lift axle assembly 100 from the stowed position to the deployed position of FIGS. 1 and 3. To deploy the lift axle assembly 100, the controller 204 controls the valve assembly 206 to vent air from the lift springs 122 and provide compressed air to the ride springs 124. The compressed air supplied to the ride springs 124 expands the ride springs, which in combination with the venting of air from the lift springs 122 rotates the beam 114 about axis 300 so that the wheel assemblies 130 contact the road surface 100.

With the lift axle assembly 100 in the deployed position, the wheel assemblies 130 support a portion of the weight of the trailer 70 through the connection of the beam 114 to the support 112 and through the ride springs 124. By supporting a portion of the trailer weight, the lift axle assembly 100 reduces the weight supported by the trailer wheels 78. Because the weight supported by a wheel is a factor in the rolling resistance produced by that wheel, reducing the weight supported by the trailer wheels 78 reduces the rolling resistance produced by the trailer wheels. The wheels assemblies 130 of the lift axle assembly 100 have a lower rolling resistance than the trailer wheels, and consequently, the added rolling resistance of the lift axle assembly 100 is less than the reduction in rolling resistance of the trailer wheels. This results in a net reduction in rolling resistance when the lift axle assembly is in the deployed position.

When the controller 204 receives a signal from the speed sensor 206 that the vehicle speed has fallen below a predetermined cruise speed, the controller controls the valve assembly 210 to move the lift axle assembly 100 from the deployed position to the stowed position. To stow the lift axle assembly 100, the controller 204 controls the valve assembly 210 to supply compressed air from the air supply 214 to the lift spring 122 and optionally vents air from the ride spring 124. The increase in pressure with the lift spring 122 and the optionally reduced pressure in the ride springs 124 rotates the beam 114 about axis 300 to raise the wheel assemblies 130 so that the wheel assemblies disengage from the road surface 10 and, therefore, do not carry any of the weight of the trailer 70.

Under braking conditions, it is desirable to have a higher portion of the weight of the trailer 70 supported by the trailer wheels 78. The flexibility of the wheels and the inclusion of brakes on the trailer wheel assemblies 76 are such that improved braking performance is achieved when the lift axle assembly 100 is in the stowed position. Accordingly, the control assembly 200 preferably includes a brake sensor 208 that senses when the brake is engage. When the controller 204 receives a signal from the brake sensor 208 that the brake has been engaged, the controller controls the valve assembly 210 stow the lift axle assembly 100.

While an exemplary embodiment of the lift axle system 100 is described, alternate embodiments are contemplated. Some alternate embodiments utilize different types of actuators, such as linear actuators, rotary actuators, hydraulic actuators, electric actuators, or any other suitable actuator alone or in combination with the disclosed pneumatic springs or with each other. Further, it will be appreciated that the disclosed lift mechanism 110 may vary within the scope of the present disclosure. In this regard, any number of different lifting mechanisms may be employed, including alternate linkage configurations, cam/roller configurations, telescoping features, and the like.

It will be appreciated that the systems described herein are capable of continual use throughout the life of the vehicle although it may require routine maintenance or repair. It will be appreciated that the systems described herein can be installed at the time of vehicle manufacture or can be retrofitting on existing vehicles. Once one of the systems described herein is installed in the vehicle, the system can continue to be used after the tires have reached their useful life. In that regard, the system in some embodiments allows simple removal of the old tire(s) and installation of the new tire(s).

It should be noted that for purposes of this disclosure, terminology such as "upper," "lower," "vertical," "horizontal," "inwardly," "outwardly," "inner," "outer," "front,"

"rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," "secured," "mounted" and variations thereof herein are used broadly and encompass direct and indirect connections, couplings, securements and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A lift axle system for a vehicle having a first axle, a first wheel, and a tire for supporting the vehicle on a road surface, the lift axle system comprising:
    (a) a lift mechanism coupled to the vehicle, the lift mechanism being positioned adjacent to the first axle and configured to reciprocate a second axle between a stowed position and a deployed position;
    (b) a second wheel coupled to the second axle, the second wheel comprising a solid wear ring for engaging the road surface when the lift mechanism is in the deployed position, the solid wear ring being disengaged from the road surface when the lift mechanism is in the stowed position, and
    (c) a controller configured to cause the lift mechanism to selectively move the second axle between the deployed position and the stowed position,
    wherein the controller is configured to cause the lift mechanism to move the second axle from the deployed position to the stowed position based on receipt of a service brake signal indicative of a service brake engaged condition, and wherein the solid wear ring has a lower rolling resistance than the tire of the first wheel.

2. The lift axle system of claim 1, wherein the tire is filled with a compressed gas.

3. The lift axle system of claim 1, wherein the lift mechanism comprises a beam rotatably coupled to the vehicle, one end of the beam supporting the second axle.

4. The lift axle system of claim 3, wherein the lift mechanism further comprises an actuator operably coupled to the beam, the actuator selectively rotating the beam between a first position and a second position, wherein the lift mechanism is in the stowed position when the beam is in the first position, and the lift mechanism is in the deployed position when the beam is in the second position.

5. The lift axle system of claim 4, wherein the actuator comprises a pneumatic spring.

6. The lift axle system of claim 4, wherein the actuator is one of an electric actuator and a hydraulic actuator.

7. The lift axle system of claim 1, further comprising a vehicle speed sensor operatively coupled to the controller, wherein the controller is configured to cause the lift mechanism to move the second axle from the stowed position to the deployed position based on receipt of a vehicle speed signal indicative of a condition that the vehicle speed has exceeded a predetermined threshold speed.

8. The lift axle system of claim 1, further comprising a service brake sensor operatively coupled to the controller and configured to generate the service brake signal.

9. The lift axle system of claim 1, further comprising an operator input device operatively coupled to the controller, wherein the controller is programmed to stow and to deploy the lift mechanism in response to operator input from the operator input device.

10. A lift axle system for a vehicle having a first axle, a first wheel, and a tire for supporting the vehicle on a road surface, the lift axle system comprising:
    (a) a beam positioned adjacent to the first axle and rotatably coupled to the vehicle;
    (b) a second axle coupled to the beam;
    (c) an actuator operably coupled to the beam to selectively rotate the beam between a stowed position and a deployed position;
    (d) a second wheel coupled to the second axle, the second wheel comprising a solid wear ring for engaging the road surface when the beam is in the deployed position, the solid wear ring being disengaged from the road surface when the beam is in the stowed position; and
    (e) a controller configured to cause the actuator to selectively rotate the beam between the stowed position and the deployed position,
    wherein the controller is configured to cause the actuator to move the beam from the deployed position to the stowed position based on receipt of a vehicle speed signal indicative of a condition that the vehicle speed has fallen below a predetermined threshold speed, and wherein the solid wear ring has a lower rolling resistance than the tire of the first wheel.

11. The lift axle system of claim 10, wherein the actuator is a first air spring engaging a first end of the beam to bias the beam toward the stowed position.

12. The lift axle system of claim 11, further comprising a second air spring engaging a second end of the beam to bias the beam toward the deployed position.

13. The lift axle system of claim 10, wherein the tire is filled with a compressed gas.

14. The lift axle system of claim 10, wherein the controller is configured to cause the actuator to move the beam from the stowed position to the deployed position based on receipt of a vehicle speed signal indicative of a condition that the vehicle speed has exceeded a predetermined threshold speed.

15. The lift axle system of claim 10, further comprising a service brake sensor operatively coupled to the controller, wherein the controller is configured to cause the actuator to move the beam from the deployed position to the stowed position based on receipt of a service brake signal indicative of a service brake engaged condition.

16. The lift axle system of claim 10, further comprising an operator input device operatively coupled to the controller, wherein the controller is programmed to stow and to deploy the beam in response to operator input from the operator input device.

17. The lift axle system of claim 7, wherein the controller is further configured to cause the lift mechanism to move the second axle from the deployed position to the stowed position based on receipt of a vehicle speed signal indicative of a condition that the vehicle speed has fallen below a predetermined threshold speed.

18. The lift axle system of claim 17, wherein the predetermined threshold speed is 45 mph.

19. A method for controlling a lift axle system for a vehicle having a first axle, a first wheel, and a tire for supporting the vehicle on a road surface, the lift axle system having a lift mechanism positioned adjacent to the first axle, a second wheel coupled to the second axle and comprising a solid wear ring for engagement with the road surface, and a controller, the method comprising:

receiving, by the controller, a service brake signal indicative of a service brake engaged condition; and based on receipt of the service brake signal by the controller, causing the lift mechanism to move the second axle from a deployed position, wherein the solid wear ring of the second wheel engages the road surface, to a stowed position, wherein the solid wear ring disengages from the road surface.

* * * * *